US006671673B1

(12) United States Patent
Baseman et al.

(10) Patent No.: US 6,671,673 B1
(45) Date of Patent: Dec. 30, 2003

(54) METHOD FOR INTEGRATED SUPPLY CHAIN AND FINANCIAL MANAGEMENT

(75) Inventors: Robert Baseman, Brewster, NY (US); William Grey, Millwood, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/534,715

(22) Filed: Mar. 24, 2000

(51) Int. Cl.⁷ .............................................. G06F 17/60
(52) U.S. Cl. ........................................................ 705/7
(58) Field of Search ........................... 705/1, 7, 10, 35, 705/36

(56) References Cited

U.S. PATENT DOCUMENTS 5,953,707 A  9/1999  Huang et al. ................. 705/10

FOREIGN PATENT DOCUMENTS

JO  11-306233 A  * 11/1999  ............ G06F/17/60

OTHER PUBLICATIONS

Hodder, J. et al., "Plant Location Modeling for the Multinational Firm", in Proceedings of the Academy of International Business Conferences on the Asia–Pacific Dimension of International Business, Honolulu, 1982.

Cohen, M.A., et al., "Resource Deployment Analysis of Global Manufacturing and Distribution Networks", Journal of Manufacturing and Operations Management, vol. 2, pp. 81–104, 1989.

Hodder, J., "Financial Market Approaches to Facility Location under Uncertainty", Operations Research, vol. 32, pp. 1374–1380, 1984.

Hodder, J., et al., "A Simple Plant–Location Model for Quantity Setting Firms Subject to Price Uncertainty", European Journal fo Operational Research; Amsterdam, vol. 21, pp. 39–46, 1985.

Rutenberg, D., "Maneuvering Liquid Assets in a Multi–National Company: Formulation and Deterministic Solution Procedures", Management Science, vol. 16, No. 10, pp. 671–684, Jun., 1970.

Breutman, R.L., et al., "PLANETS: A Modeling System for Business Planning", Interfaces, pp. 94–106, Jan.–Feb., 1987.

Arntzen, B.C., et al., "Global Supply Chain Management at Digital Equipment Corporation", Interfaces, pp. 69–93, Jan.–Feb., 1995.

(List continued on next page.)

*Primary Examiner*—Tariq R. Hafiz
*Assistant Examiner*—Susanna Meinecke-Díaz
(74) *Attorney, Agent, or Firm*—Whitham, Curtis & Christofferson, P.C.; Stephen C. Kaufman

(57) ABSTRACT

A method to generate a strategic business plan to improve operations, and to closely monitor various performance measures of an enterprise. This is accomplished employing a more comprehensive approach to maximizing profitability, increasing revenue, and explicitly considering risk. In particular, the method extends supply chain management using financial management considerations, extends financial management using supply chain management considerations, employs supply chain management techniques to improve financial management, and employs financial management techniques to improve supply chain management. The method uses information and models derived from at least one of the following business processes: accounting; cash management; funds management, financing, profitability analysis, risk management, loan management, treasury management, investments management, business development, order management, demand planning and forecasting, procurement, production planning, inventory management, transportation and distribution, and supply chain design.

4 Claims, 4 Drawing Sheets

OTHER PUBLICATIONS

SAP AG, SAP's Supply Chain Management Initiative—Information, pub. unknown, web pages from http://www.sap.com.

SAP AG, "R/3 System Financial", pub. date unknown, web pages from http://www.sap.com.

Baan Company NV, pub. date unknown, web pages from http://www2.baan.com.

Oracle, "Oracle Applications", *pub. date unknown*, web pages from http://oracle.com.

IBM, "New Oracle Tools Tap ERP's Potential", pub date unknown, web pages from http://itirc.ibm.com.

Author unknown, "Oracle Releases Strategic Enterprise Management", pub. date unknown, web pages from http://www.lahaaland.com.

Gordon, G., "Contribution of Logistics and Supply Chain Management to Shareholder Value", San Antonio, Texas, Sematech: Nov. 1999.

Schroeder, Roger G. Operations Management: Decision Making in the Operations Function (4$^{th}$ ed). McGraw–Hill, Inc., pp. 662–687, 801–848, ©1993.*

Stevenson, William J. Production/Operations Management (2$^{nd}$ ed). Irwin, pp. 214–236, ©1986.*

* cited by examiner

METHOD FOR INTEGRATED SUPPLY CHAIN AND FINANCIAL MANAGEMENT

BACKGROUND OF THE INVENTION

1. Field of the Invention

The present invention generally relates to a method to assist senior management decision-making, and to closely monitor various performance measures of an entire enterprise. Specifically, the method relates to extending Supply Chain Management (SCM) using Financial Management (FM) considerations, as well as extending FM using SCM considerations. This is accomplished by employing a more comprehensive approach to maximizing profitability, and increasing revenue, and explicitly considering risk.

2. Background Description

Current methods for supply chain management (SCM) and financial management (FM) practice are incomplete. Supply chain management solutions focus on the goods and information flows, but neglect financial requirements. Financial management solutions focus on financial flows, but do not adequately incorporate supply chain management needs.

Businesses require complete solutions that integrate the supply chain and finance functions. Financial management considerations such as international taxes, foreign exchange risk management expense, and financing choices can be critical to supply chain decisions. Although they have no impact on traditional of supply chain performance measures such as logistics costs and cycle time, these financial management factors go straight to the bottom line, and can have a dramatic impact on a firm's financial performance. In some cases, companies have developed ad hoc systems linking supply chain management and financial planning activities. However, the effectiveness of these solutions has been constrained by limited sharing of information, and locally optimized decision-making.

The current state of the Supply Chain Management and Financial Management marketplace, the nature of existing software solutions, and the competitive position of key vendors is discussed below. Many academics and practitioners have attempted to bridge the gap between Supply Chain Management and Financial Management, but they have only been partially successful.

The Supply Chain Management and Financial Management Solutions Marketplace

Supply Chain solutions operate at three levels:

Execution level—Enterprise Resources Planning (ERP);

Planning level—Supply Chain Management (SCM); and

Strategic level—Strategic Enterprise, Systems (SES).

FIG. 1 shows the evolution of these solutions in the marketplace. Earlier solutions, i.e., circa 1985–1993, consisted of in-house solutions or material requirement planning and distribution requirement planning. These previous methods have failed to use information technology to integrate Supply Chain Management and Financial Management. They have also failed to exploit significant opportunities to improve financial performances by integrating Supply Chain Management and Financial Management. The early to mid-1990's saw a move to enterprise resource planning consisting of bookkeeping, automating traditional functional activities, and data integration. The late-1990's saw a further move toward advanced planning systems, or supply chain management which uses sophisticated and "intelligent" decision-support systems for different enterprise functions. A Strategic Enterprise Systems (SES), which is the subject of the present invention, does not yet exist in state of the art systems.

The degree of integration in current offerings is very good at the execution level. It spans a wide range of functions, from human resources (HR) to plant operations. However, only sparse integration at the planning level exists, today.

The current trends in business application software development are toward custom software, developed in-house; commercial products marketed by function (scheduling software, accounting software, etc.); integrated suites and niche product. However, a complete integrated solution does not yet exist. Key industry trends include:

De facto linkages between enterprise resource planning (ERP) and SCM where SCM vendors have aligned their applications with dominant ERP systems to facilitate integration;

Vertical Focus where product and marketing strategies focus on market segments and niches;

Increasing industry consolidation through mergers and acquisitions; key ERP vendors are acquiring new expertise and product offerings to enter the lucrative SCM market; but the market is still fragmented; and Increasing solution integration where ERP vendors are pursuing a product bundling strategy, linking planning and decision support tools with their ERP products, and current industry strategy, according to AMR Research, Inc. of Boston, Mass., calls for vendors to integrate their product suites to serve as backbones to support real-time supply chain decision-making.

ERP systems are currently available from SAP AG of Walldorf, Germany (R/3™); Oracle Corporation of Redwood City, Calif. (Oracle Discrete Manufacturing, Oracle Flow Manufacturing); Baan Company NV of Hemdon, Va. (BaanERP, Baan Supply Chain Solutions), PeopleSoft, Inc. of Pleasonton, Calif. (PeopleSoft Supply Chain Planning, PeopleSoft Production Management), and J. D. Edwards and Company of Denver Colo. (J. D. Edwards Manufacturing Suite, J. D. Edwards Logistics/Distribution Suite, J. D. Edwards Financial Suite).

SCM systems are currently available from I2 technologies of Irving, Tex. (Rhythm™), Manugistics Group, Inc. of Rockville, Md. (The NetWORKS™ Solution Set), SAP AG, Oracle Corp. (Oracle Applications Release Financials), Baan Company NV, and ILOG SA of Mountain View, Calif. (ILOG Optimization Suite).

ERP products for Financial Management are available from SAP, Oracle, PeopleSoft, J. D. Edwards, and Baan.

Current accounting solutions are capable of the following:

General Ledger—Central repository of accounting transactions;

Accounts Receivable and Payable—Tracks customer sales and receipts, and vendor purchases and payments;

Asset Accounting—Tracks fixed assets;

Funds Management—Tool for planning, managing and monitoring a firm's funds; and

Activity-based costing—Monitors and controls costs of cross-departmental business processes, functions and products.

Current financial management solutions are capable of the following:

Profitability analysis—Analyzes sources of profits. Revenues are matched with costs by market segment, or other business rules. Critical decision support tool for product pricing, customer selection, targeting distribution channels, etc.;

Corporate-wide budgeting—Investment planning and budgeting for the entire enterprise. Tracks available budgets, and compares planned and incurred costs;

Cash Management—Provides information on sources and uses of funds to ensure liquidity to meet payment obligations. Supplies data for managing short-term investments and borrowing;

Treasury Management—Manages the treasury function, including foreign exchange and electronic funds transfers;

Loan Management—Automates loan-manage process, and tracks interest and repayment terms; and Risk Management—A set of tools to monitor and assess risk, usually using value-at-risk measures.

Academic research to date has tended to focus on highly specialized or niche subjects. A vast literature exists on specific supply chain management subjects such as optimizing inventory policies, network design, routing schemes, and resource allocation. There has been an accelerating trend towards applying academic research results to the practice of corporate management. Researchers and practitioners, in particular in the Operations Management/Operations Research (OM/OR) community, have developed a framework, under the rubric of SCM, to link these various fields. Historically, they have focused on the operational side of a company's activities. From a theoretical standpoint, integration of different aspects of SCM, even on the operations side, is still in its infancy. This is due mainly to a legacy problem: many well known and widely used results would have to be revised to support integration. Furthermore, the mathematical difficulties involved in integration can be non-trivial.

On the finance side, there is a large body of work focusing on topics such as optimal capital structure, cost of capital, hedging methodologies, tax minimization strategies, and depreciation methods. Theoretical linkages between SCM and other fields, such as accounting, corporate finance, international tax law, etc, are not well-established in the academic literature. Some linkages have been proposed, primarily by practitioners, but in a fragmented fashion. Some of the relevant literature that tries to bridge this gap is described below.

Current SCM practice is described in Sridhar Tayur, Ram Ganeshan and Michael J. Magazine, "Quantitative Models for Supply Chain Management (International Series in Operations Research & Management Science, 17)" (December 1998, Kluwer Academic Publishers). This book is a collection of papers by leading authorities in the field of supply chain management, each covering one aspect of SCM, and providing extensive references.

Most models in the current literature use MIP (Mixed Integration Program) models for supply chain design. The optimization objective is typically to minimize costs, although some seek to maximize profit. The general modeling approach—and the concomitant obstacles to incorporating foreign exchange risk—are summarized in the following excerpt from a paper by Morris Cohen and Arnd Huchzermeier:

"The current state-of-the-art in global manufacturing strategy planning models can be characterized by two fundamental approaches: network flow models and option valuation models. Network flow models exploit primarily portfolio effects within the firm's global supply chain network. In general, network structure decisions are numerous, but are exercised rather infrequently, e.g., on a periodic base. Alternatively, option value models focus primarily on production switching or sourcing decisions contingent on future states of nature. In general, production options are limited, but can be exercised frequently, e.g. on a continuous basis. The polarization in research is due to the analytical complexities of each modeling approach, i.e. network complexity in the first case and stochastic complexity in the second case. Consequently, there persists a significant gap in the literature on unified modeling approaches for global manufacturing strategy options under exchange risk."

See Morris Cohen and Arnd Huchzermeier, "Global Supply Chain Management: a Survey of Research and Applications", *Quantitative Models for Supply Chain Management* (Ed. S. Tayur, R. Ganeshan, M. Magazine; Kluwer Academic Press 1999) pp. 669–702.

Several authors have proposed simple models linking SCM to FM. Single-period, deterministic models have been developed by James E. Hodder, "Plant Location Modeling for the Multinational Firm", *Proceedings of the Academy of International Business Conference on the Asia-Pacific Dimension of International Business*, Honolulu, 1982, M. A. Cohen, M. L. Fisher and R. Jaikumar, "International Manufacturing and Distribution Networks: A Normative Model Framework," *Managing International Manufacturing* (Ed. Kasra Ferdows: North-Holland, Amsterdam: 1989), and M. A. Cohen and H. L. Lee, "Resource Deployment Analysis of Global Manufacturing and Distribution Networks," *Journal of Manufacturing and Operations Management*, Vol. 2, pp. 81–104, 1989. Hodder developed a mixed-integer programming formulation that combines decisions for plant location, resource allocation, and local borrowing. Cohen, Fisher and Jaikumar propose a hierarchical solution procedure for a nonlinear, mixed-integer programming formulations that defines optimal transfer prices as well as resource allocation, production and sourcing decisions.

For a variety of exchange rate scenarios, Cohen and Lee exploit the potential of a firm's flexible manufacturing and distribution network to balance the firm's global after-tax profit. All of these formulations do not explicitly allow for randomness and dependencies in the cash flows between locations. Doing this ultimately leads to portfolio effects, which can have a significant impact on a firm's choice of global manufacturing strategy.

James E. Hodder, "Financial Market Approaches to Facility Location under Uncertainty," *Operations Research*, Vol. 32, pp. 1374–1380 (1984), James E. Hodder and James V. Jucker, "A simple Plant-Location Model for Quantity-Setting Firms Subject to Price Uncertainty," *European Journal of Operational Research*, Amsterdam, Vol. 21, pp. 39–46 (1985), James E. Hodder and James V. Jucker, "International Plant Location Under Price and Exchange Rate Uncertainty," *International Journal of Production Economics*, Vol. 9, pp. 225–229 (1985) and James E. Hodder and C. Dincer, "A Multifactor Model for International Plant Location and Financing under Uncertainty," *Computers and Operations Research*, Vol. 13, No. 5, pp. 601–609 (1986) adopted a mean-variance objective function. Their proposed problem formulations are based on a multi-factor model for exchange rate determination. However, multi-factor models have performed rather poorly over the period of floating exchange rates.

The model presented in Morris Cohen and Arnd Huchzermeier seeks to maximize the profits of an international company, considering both exchange rate risk and demand uncertainty. They employ a generic model, where uncertainty is captured by expected values.

Issues of ownership structure, fees, royalties etc. are addressed in an early paper by David P. Rutenberg, "Maneuvering liquid assets in a multi-national company: formulation and deterministic solution procedures," *Management Science*, Vol. 16, No. 10, pp. 671–684 (June 1970). This paper represents a partial analysis for tactical planning, since it takes as given the planned operations of each national subsidiary, and hence whether the subsidiary is to be a net source or recipient of funds each year.

Application cases have been reported in P. S. Bender, W. D. Northup and J. F. Shapiro, "Practical Modeling for Resource Management," *Harvard Business Review*, pp. 163–173 (March–April 1981), in the paper industry; in R. L. Breitman and J. M. Lucas, "PLANETS: A Modeling System for Business Planning," *Interfaces*, pp. 94–106 (January–February 1987) for the automobile industry; in Cohen and Lee and in B. C. Arntzen, G. G. Brown, T. P. Harrison and L. L. Trafton, "Global Supply Chain Management at Digital Equipment Corporation," *Interfaces*, pp. 69–93 (January–February 1995) for computer assembly. The model of Arntzen et al. builds on the models of Cohen and Lee (1989) and Huchzermeier (1991) by explicitly considering issues such as duty drawbacks and tariffs. Operational hedging is discussed by Panos Kouvelis in "Global Sourcing Strategies under exchange rate uncertainty". Gordon Gilstrap, "Contribution of Logistics and Supply Chain Management to Shareholder Value," *The Sematech Semiconductor Logistics Forum*, November 1999, indicates that in the future there will be linkages between financial flows and other aspects of the supply chain, but provides no further detail.

More recently, the literature has focused on real options in supply chains. Examples of real options are considered, with option values derived in very simple and stylized settings. Supply chain network options differ from project options, because they exploit synergies derived from global coordination of multiple investments, i.e. network design decisions; and from global coordination of sourcing and distribution logistics, i.e. network material flow decisions. This more realistic context has not been considered by the current literature on valuing non-financial options.

There are a number of limitations to the approaches as described above. In particular, they consider only one exchange rate process, they assume a constant dividend rate, they utilize a cost minimization objective rather than an after-tax profit maximization objective, they consider only a few production switching options, and/or they deal only with a single-period production planning problem.

There are currently no models that effectively integrate SCM and FM. In particular, none of the models effectively considers the tight coupling of the production decision with cash flow movements, royalty fees, dividend repatriation, etc.

SUMMARY OF THE INVENTION

It is therefore an object of the invention to provide a method to assist senior management decision-making, and to closely monitor various performance measures of an entire enterprise. Specifically, the method relates to extending Supply Chain Management (SCM) using Financial Management (FM) considerations, as well as extending FM using SCM considerations. This is accomplished by employing a more comprehensive approach to maximizing profitability, and increasing revenue, and explicitly considering risk.

Broadly speaking, these integration opportunities enhance traditional supply management techniques in two ways:

1. Employing a more comprehensive approach to maximizing profitability, and increasing revenue. This is accomplished by tightly integrating SCM and FM to exploit opportunities created by dynamically responding to changes in market prices, demand, and foreign exchange rates. Several different approaches can be used. Probably the most promising, at least in the near-term, is to identify new ways to maximize profits by incorporating financial considerations into supply chain management decisions. These considerations include the objective of reducing corporate income taxes, personal property taxes, and dividend withholding taxes, as well as improved utilization of financial assets, such as cash "inventories". There are also opportunities to integrate supply chain considerations and techniques into financial management decisions. In particular, by placing greater emphasis on the timing of the receipt of cash inflows, supply chain solutions can improve utilization of financial assets, such as cash and receivables. Finally, the greatest benefits can be gained by simultaneously integrating both supply chain management and financial management.

2. Explicitly considering risk The impact of risk can be assessed in a number of different ways, but probably most important is its affect on funding costs and the firm's cost of capital. The approach seeks to reduce interest expense by exploiting SCM to expand the firm's set of financing opportunities, and by improved decision-making. And it seeks to reduce the firm's cost of capital by reducing sensitivity to a suite of risk factors, including foreign exchange risk, interest rate risk, political risk, catastrophe risk, business risk, counterparty risk, credit risk, and geographic risk.

According to the invention, a strategic business plan is generated to assist decision-making, and to closely monitor various performance measures of an enterprise by extending supply chain management using financial management considerations. The method uses information and models derived from at least one of the following planning processes:

Supply chain management—designing a supply chain model for a firm utilizing firm-specific information including strategic objectives, a desired level of risk, market position of the firm and industry competitive landscape;

extended demand planning—determining which customer demands to fulfill, and when to fulfill them, while factoring in demand uncertainty, capacity and time constraints;

inventory management—developing inventory policies to service stochastic customer demand, using information related to service targets, budgets, stock out probabilities and costs and demand fulfillment rates;

procurement planning—mitigating foreign exchange risk by considering the firm's global foreign exchange position using vendor selection, thereby reducing foreign exchange exposures; and production planning—dynamically shifting production in coordination with procurement planning to locations with weak currencies, thereby reducing production costs.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
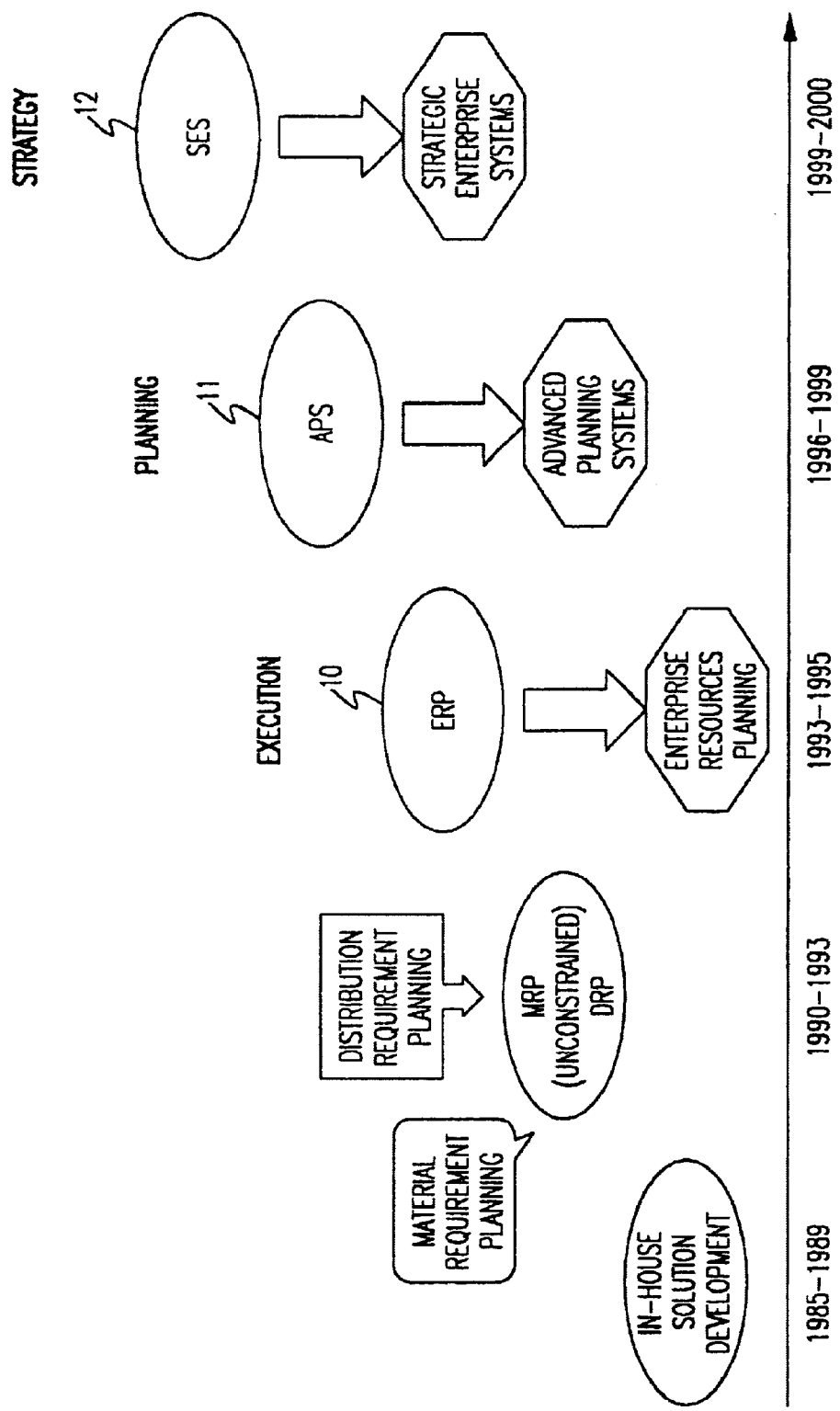
FIG. 1 shows the evolution of Supply Chain solutions in the marketplace.

Referring again to the drawings, and more particularly to FIG. 1, there is shown the evolution of Supply Chain solutions in the marketplace. Supply chain solutions operate at three levels:

Execution level—Enterprise Resources Planning (ERP);
Planning level—Supply Chain Management (SCM); and
Strategic level—Strategic Enterprise Systems (SES).

The ERP level 10 typically comprises bookkeeping, automating traditional functional activities and data integration. The planning or supply chain management (SCM) level 11 typically comprises sophisticated and "intelligent" decision-support systems for different enterprise functions. The strategic level 12 typically comprises applications to assist senior management decision-making, and to closely monitor various performance measures of the entire enterprise. A complete strategic level system is not currently available in the state of the art.

Extensions to Supply Chain Management Using Financial Management Considerations Extended Supply Chain Design Supply chain design involves decisions such as facility location, capacity and production planning, market selection, supplier selection, transportation planning, inventories levels, transaction currencies, pricing policies, outsourcing decisions, and design of ownership structure. Supply chain design is a primary source of competitive advantage, and a major contributor to a firm's cost structure.

Supply chain design must be performed within the context of a firm's strategic objectives, its desired level of risk, its market position, and its industry's competitive landscape. These factors are not all typically considered in today's SCM models. Traditional heuristic-based approaches employed by tax-planners are sub-optimal because they do not use optimization techniques to simultaneously address the primary factors affecting the value and profitability of a firm, and they do not explicitly address the impact of risk.

Traditional SCM solutions take a firm's ownership structure as a given, and attempt to optimize its supply chain by minimizing costs. They typically focus on logistics costs such as transportation costs, duties, and inventory carrying costs, ignoring highly leveraged factors such as taxes. For global and multinational firms, there may be significant tax minimization opportunities by:

Optimizing ownership structure and transfer pricing methodologies for an existing supply chain with the objective of maximizing profit;

Optimizing supply chain design for an existing ownership structure, by seeking to maximize profit or value of the firm within the context of considerations such as international taxation, foreign exchange risk management; and Simultaneously optimizing supply chain design and ownership structure, with the objective of maximizing profit or the value of the firm.

Supply chain design can also be used to reduce a firm's foreign exchange exposure by matching production locations with customer locations. However, when considering the impact of foreign exchange risk, there is a trade-off between a firm's profitability, and the benefits of reducing risk by creating a supply chain that is "naturally hedged." By using a constrained mathematical model with this trade-off modeled in the objective function, one can create an efficient frontier showing optimal expected profits for a chosen level of risk. All three of these optimizations can be solved as a network design problem, a well-known approach that can be implemented with existing software tools.

An alternative approach is to estimate the loss in profitability associated with designing a supply chain to reduce risk. If this "opportunity cost" is less than the cost of obtaining a similar position with traditional financial risk management techniques, proposed supply chain design changes should be implemented. Finally, Monte Carlo simulation can be used to "stress test" proposed supply chain designs, testing their robustness to different foreign exchange rate scenarios. It can also be used to analyze the impact of foreign exchange movements on the profitability of a given supply chain design, particularly in cases where customer demand is correlated with foreign exchange rates.

More generally, either of these approaches can be used to optimize a firm's supply chain within the context of other forms of risk. An efficient frontier can be created that identifies optimal supply chain designs to maximize profitability or firm value at a given risk level with respect to one or more sources of risk, such as political risk, catastrophe risk, business risk, geographical risk, and/or local market risks. Where risk can be priced in the marketplace, the opportunity cost approach can be used as a benchmark for assessing the best way to manage these types of risk as well. And if risk cannot be priced in the marketplace, the benchmark can still be used as a tool to facilitate decision-making. Simulation can then be used to stress test alternative designs, testing their robustness.

Extended Demand Planning

The demand planning process attempts to determine which customer demands to fulfill (and when) in the face of demand uncertainty, and capacity and time constraints. Traditional criteria affecting this decision include the size and due date of the order, the strategic importance of the customer, the flexibility in the required due date, and penalties and discounts specified in the terms and conditions of the customer contract.

By integrating SCM with FM, demand planning can be used to more effectively optimize profitability by considering a broader range of factors influencing decision-making. For example, a view of the firm's global tax position and its marginal tax rate in different tax jurisdictions permits demand planning to be optimized on an after-tax basis by targeting customers based on their after-tax profitability. Better integration of management accounting information into the demand planning process permits more accurate modeling of production costs, improving the demand planning process when seeking to maximize profit. Historical customer payment patterns can be used to forecast the expected timing of customer payments, thus permitting the time value of money to be considered when assessing the profitability of a delivery to a particular customer. If the company's treasury has a view on expected foreign currency movements, shipments denominated in a depreciating currency can be expedited, and shipments denominated in an appreciating currency can be deferred. And by coordinating demand planning and customer fulfillment with the firm's cash management function, decreasing the firm's cash requirements, and short-term volatility in its cash position.

In a similar fashion, integrated demand planning can help mitigate a number of different risk factors, including credit risk, political risk, and business risk. A view of the firm's foreign exchange position can help enable the demand planning process to augment the firm's natural hedging programs by allocating demand to firms based on their impact on the firm's global foreign exchange exposure. Integration with accounts receivable information permits demand planning to globally limit credit risk. A view of the firm's global business and political risk position permits diversification strategies to be implemented through selective demand fulfillment.

Inventory Management

Inventory management is the process of developing and implementing inventory policies to service stochastic customer demand, given parameters such as service targets, budgets, stock out probabilities and costs, and demand fulfillment rates.

Inventory planning is probably the most successful application in SCM, and the one most studied in literature. Significant amounts of capital are tied up in work-in-process inventory in the supply chain, and even small reduction in inventory levels can save companies millions of dollars.

Current inventory planning systems do not permit firms to adapt their inventory management policies to take into account key financial objectives of the firm, including optimal cash management, and profit maximization. Although most companies have implemented ERP systems to manage their physical inventory and automate order processing, few firms have analyzed their inventory policies to identify the one that best fits their needs. Fewer still revise their inventory policy to respond to changes in their business environment.

Traditional inventory planning systems do not consider financial management objectives, particularly those related to cash management, changes in product profit margins, income taxes, and personal property taxes. Examples of how these can be addressed are described below:

Optimal inventory policies should seek not only to meet demand requirements, but also to align the timing of cash outflows with the firm's global cash position. For example, if cash is constrained, reordering might be deferred for certain products. This would help minimize borrowing, and reduce liquidity requirements. In addition, the timing of cash inflows from product sales does not typically correspond precisely with the booking of a sale, since customers frequently delay payments. For certain product lines, and for certain customer sets, there may be consistent patterns in the timing of payments. The impact of these delays on product profitability should be considered when determining optimal inventory policies.

Product profitability can change over time, and inventory policies should be dynamically adjusted to reflect this. Inventory policies should link service level requirements for specific products to product profitability. However, the same product can have different profit margins in different markets, so inventory levels (and inventory policies) in different markets should be different.

Changes in demand can affect a product's market price, and hence its profitability. This presents an opportunity for tax minimization, since taxes can be reduced by dynamically changing the location of inventory to source low-margin products in high tax venues, and high-margin products in low tax venues. Changes in foreign exchange rates can also affect product profit margins, presenting similar opportunities to save taxes with dynamic sourcing.

When determining inventory policies, traditional inventory management systems ignore the impact of personal property taxes on inventories. By shifting assets with high value and low transportation costs to jurisdictions with lower personal property tax rates, profitability can be improved.

Procurement

Traditional SCM approaches to procurement focus on supplier selection, and determining the quantities of goods to purchase from each supplier. Since procurement represents a major source of expenditures for a company, reducing product and logistics costs is typically its primary focus. Other factors considered include product quality, supplier reliability, delivery lead-time, and supplier flexibility.

Integrating SCM with FM offers a number of opportunities to minimize risk. By considering a firm's global foreign exchange position, foreign exchange risk can be mitigated by using vendor selection to reduce foreign exchange exposures. This approach has an advantage over purely financial hedges, since it provides a longer-term hedge, it provides flexibility with respect to changes in demand, and has lower transactions costs. A firm is sometimes both a customer and supplier of another firm. In such cases, credit risk can be handled more effectively by globally managing credit exposures. By diversifying a firm's supplier base, indirect exposure to catastrophe risk can be reduced, thus mitigating the impact of a natural disaster on the firm's global supply chain.

There are also a number of opportunities for cost savings. If multiple vendors are used for a product, and supply contracts that include flexibility provisions, costs can be reduced by denominating supply contracts in local currencies, and dynamically shifting vendor allocations to exploit shifting foreign exchange rates. Financing costs can be reduced by optimizing the timing of payments to vendors, considering factors such as the vendor's payment terms, the firm's global cash position, and expected foreign exchange movements.

Production

Traditional approaches to production planning seek to maximize profits or minimize costs while fulfilling customer demands. They use a number of approaches, including optimally allocating production to multiple facilities under capacity constraints, optimally allocating resources, and using yield management.

Integrating SCM with FM presents several opportunities to improve profitability and reduce risk by considering a broader range of factors influencing decision-making. Production costs can be reduced by dynamically shifting production (in coordination with the procurement function) to locations with weak currencies. Considering the firm's global foreign exchange position during production planning can reduce foreign exchange risk by creating opportunities to shift production to operationally hedge exposures. Information about the firm's global tax position and its marginal tax rate in different tax jurisdictions permits after-tax optimization of production planning by coordinating production to maximize after-tax profitability. Greater integration of management accounting information into the production planning process permits more accurate modeling of production costs, improving decision-making.

Figure 2:
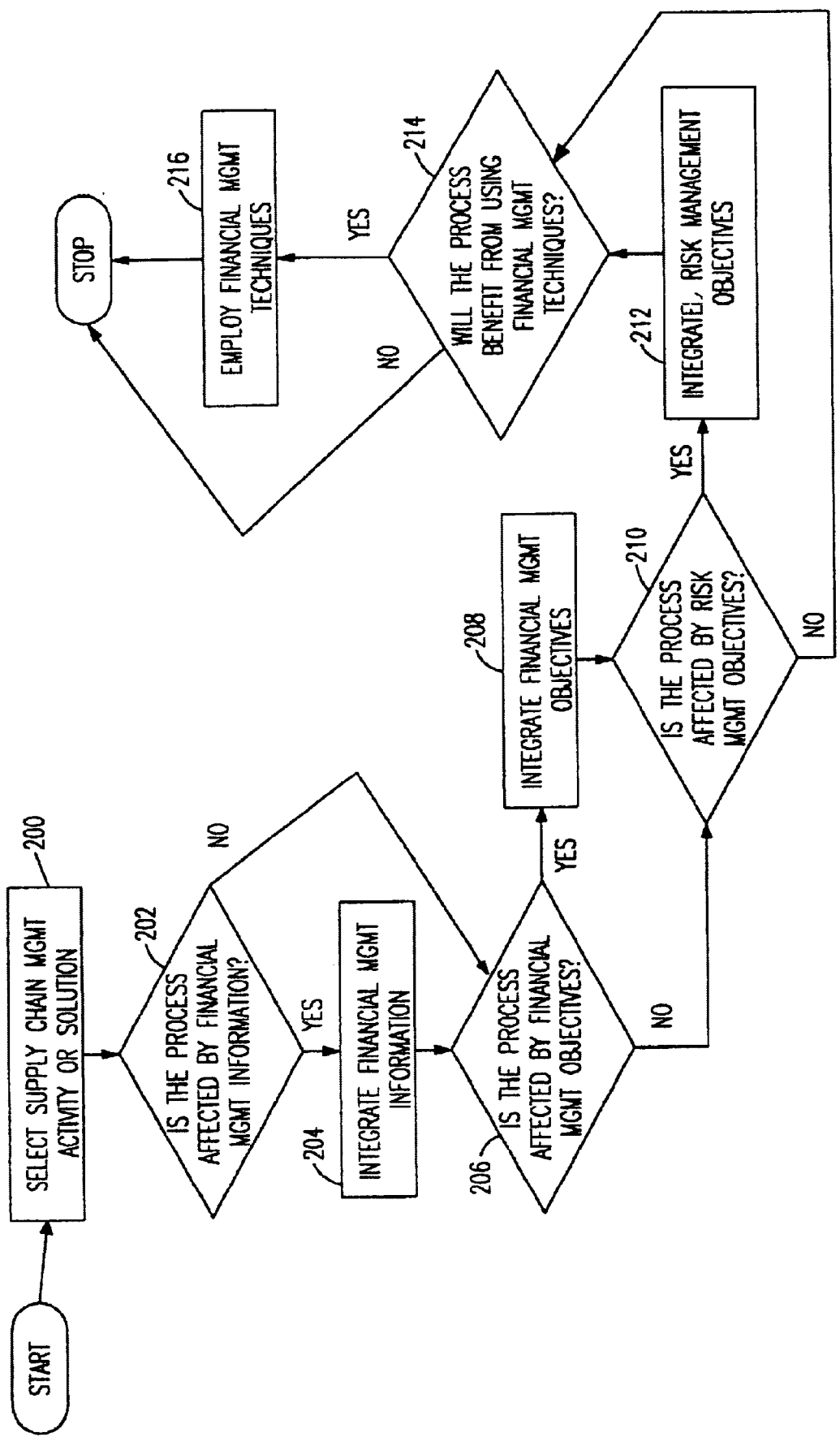
FIG. 2 is a flow diagram of the general method for extending Supply Chain Management solutions according to the present invention.

Referring now to FIG. 2, there is shown a flow diagram of the general method for extending SCM solutions according to the preferred embodiment of the present invention. This aspect of the present invention is the implementation of an extension to SCM using FM considerations as described in detail, below. If management chooses to plan by extending the SCM activity or solution with FM information, the process begins at block 200. One or more SCM activities or solutions is selected for integration. Examples of SCM activity or solutions include: demand planning (including forecasting, targeted marketing), production planning (including category management, materials planning, procurement, capacity planning), transportation planning (including carrier management, load planning, import/export regulations compliance), inventory management, transportation scheduling (including route planning, vehicle scheduling, in-transit goods management), distribution, finished goods inventory planning, distributed resources planning, and deployment planning.

For each supply chain management activity in the planning activity, a determination is made as to whether the activity/solution is affected by FM information, in decision block 202. Being affected by FM information means that improvements in strategy, tactics, planning, or operations would result by broadening the scope of information available through integration. FM information is information used by, useful for, required by, or available to, FM activities or solutions. Examples of Financial management activities or solutions include: foreign exchange risk management (including management of economic exposures, transactional exposures, and accounting exposures), working capital management (including short-term financing, trade financing, current asset management, inter-company financial management, and cash management), investment analysis (including analysis of portfolio investments, foreign direct investments, capital budgeting), capital structure strategy and implementation, risk management, tax management, foreign investment analysis (including analysis of portfolio investments, and foreign direct investments), foreign operations financing, international financing, special financing vehicles, and global financing strategy.

If the SCM activity is affected by FM information then the financial management information is integrated into the activity in block 204. FM information is integrated to improve the performance of the SCM activity or solution. This can be performed in a number of different ways, depending on the nature of the activity or solution, and the information being integrated. Typical approaches could use techniques such as heuristics, consulting methodologies, simulation, and optimization. Examples of embodiments of this form of integration include:

Strategic business design considering taxes, transfer pricing, manufacturing and network design;

Strategic manufacturing and network design considering ownership structure;

Simultaneous business design and network design;

Sourcing of production (tactical) considering tax management;

Location of new facilities selected considering foreign exchange risk;

Vendor selection (strategic/tactical) considering foreign exchange risk;

Vendor selection (tactical) considering tax management;

Sourcing of production (strategic/tactical) considering foreign exchange risk;

Reducing funding costs and cost of capital (both short and long term) using vendor selection, sourcing of production, and location decisions;

Location of now facilities selected considering dividend repatriation;

Inventory management considering personal property taxes (total cost of inventory);

Sourcing of production (strategic/tactical) to assure profits are in countries where dividend repatriation is favorable;

Vendor selection (strategic/tactical) considering constraints on dividend repatriation;

Blocked funds in a country addressed by vendor selection, sourcing of production (strategic/tactical), or location decisions;

Customer selection (product allocation) considering credit risk (for all operating divisions, etc.);

Customer selection taking into account foreign exchange risk;

Customer order scheduling taking into account foreign exchange risk;

Customer order scheduling taking into account timing of the cash to cash cycle, and the firm's cash needs; and Inventory management considering the timing of cash flows.

These activities are described in detail below:

Strategic Business Design Considering Taxes, Transfer Pricing, Manufacturing and Network Design This approach extends the traditional process of strategic business design by considering the impact of an existing (or proposed) supply chain network design. Considerations include logistics costs, inventory costs, supply chain performance, requirements for strategic marketing presence, and so on. A number of techniques can be used to perform this integration. These include:

Using a set of heuristics, such as "perform high value-added, high profit activities in low tax jurisdictions only if the benefits outweigh the additional logistics and supply chain costs";

Using expert systems and/or other decision support tools to guide business design by considering the impact of manufacturing location and network design;

Use of simulation techniques to identify high return, low risk solutions; and

Use of linear programming, mixed integer programming, and other forms of optimization to maximize profit (perhaps with additional objectives such as reducing risk, and perhaps meeting particular strategic requirements such as increasing regional market share).

Strategic Manufacturing and Network Design Considering Ownership Structure

This approach extends the traditional process of supply chain network design by considering the way the entire business is structured. Considerations include the ownership structure of the firm and its subsidiaries, the tax jurisdictions of the firm and its subsidiaries, and the allocation of value-added activities to various stages of the network and to various subsidiaries. Transfer pricing policy is an important decision variable. A number of techniques can be used to perform this integration. These include:

Using a set of heuristics, such as "perform high value-added, high profit activities in low tax jurisdictions if the benefits outweigh the additional logistics and supply chain cost";

Using expert systems and/or other decision support tools to guide supply chain network design by considering the impact of ownership structure and business design;

Use of simulation techniques to identify high return, low risk solutions; and

Use of linear programming, mixed integer programming, and other forms of optimization to maximize profit (perhaps with additional objectives such as reducing risk, and perhaps meeting particular strategic requirements such as increasing regional market share).

Simultaneous Business Design and Network Design

This approach combines the traditional processes of supply chain network design and business design by simultaneously considering all relevant factors for each of these two processes. Considerations include required network performance, existing network structure, existing manufacturing facilities, required production capacity, the ownership structure of the firm and its subsidiaries, the tax jurisdictions of the firm and its subsidiaries, and the allocation of value-added activities to various stages of the network and to various subsidiaries. Transfer pricing policy is an important decision variable. A number of techniques can be used to perform this integration. These include:

Using a set of heuristics, such as "perform high value-added, high profit activities in low tax jurisdictions if the benefits outweigh the additional logistics and supply chain costs";

Using expert systems to guide supply chain network design and business design simultaneously;

Use of simulation techniques to identify high return, low risk solutions; and

Use of linear programming, mixed integer programming, and other forms of optimization to maximize profit (perhaps with additional objectives such as reducing risk, and perhaps meeting particular strategic requirements such as increasing regional market share).

Sourcing of Production (Tactical) Considering Tax Management

This approach extends traditional supply chain sourcing decisions, which determine which production facilities or suppliers should be used to manufacture a particular product. A number of tactical tax management considerations can be used to improve planning and operations. For example, in cases where there are multiple sources for a set of products, dynamic changes to production sourcing can reduce income taxes. This can be done by dynamically shifting the production of low margin products to high tax jurisdictions, and shifting production of high margin products to low tax jurisdictions. This would make sense when relative gross profit margins for these products change as a result of changes in market prices (affecting revenue), and changes in production costs (affecting costs).

A number of techniques can be used to perform this integration. These include:

Using a set of heuristics, such as "perform high value-added, high profit activities in low tax jurisdictions if the benefits outweigh the additional logistics and supply chain costs";

using expert systems and/or other decision support tools to guide supply chain sourcing decisions while considering tax management issues;

Use of simulation techniques to identify high return, low risk solutions; and use of linear programming, mixed integer programming, and other forms of optimization to maximize after-tax profit (perhaps with additional objectives such as reducing risk, and perhaps meeting particular strategic requirements such as increasing regional market share).

Location of New Facilities Selected Considering Foreign Exchange Risk

This approach extends traditional supply chain location decisions, which determine where new facilities should be located. A number of foreign exchange risk management considerations can be used to improve location decisions. For example, by considering the firm's global foreign exchange exposure, preference can be given to locations that reduce economic, transactional, or translational exposure. Facilities can also be located to provide flexibility to exploit changes in foreign exchange rates to dynamically change sourcing in order to (1) reduce production costs, (2) increase revenues, or (3) reduce taxes. For example, these two goals can be accomplished by (1) dynamically shifting the production to locations with the lowest factor input costs; (2) dynamically shifting production to facilities collocated with markets having the highest prices for the manufactured products; (3) assessing the impact of foreign exchange on local profit margins, then dynamically shifting production of low margin products to high tax jurisdictions, and shifting production of high margin products to low tax jurisdictions.

A number of techniques can be used to perform this integration. These include:

Using a set of heuristics, such as "locate new facilities in regions whose currencies have a low or negative correlation with my current foreign exchange position;

Using expert systems and/or other decision support tools to include foreign exchange risk management factors when making location decisions;

Use of simulation techniques to identify solutions that minimize the expected impact of foreign exchange risk, while maximizing expected return from investment in a new facility; and Use of linear programming, mixed integer programming, and other forms of optimization to maximize profit subject to certain foreign exchange risk parameters, or by using a multiple objective function that includes foreign exchange risk as an optimization objective, along with other objectives such as maximizing profit and meeting strategic requirements such as increasing regional market share.

Vendor Selection (Strategic/tactical) Considering Foreign Exchange Risk

This approach extends traditional supply chain vendor selection decisions, which determine which suppliers should be selected and used to manufacture a particular product. A number of foreign exchange risk management considerations can be used to improve vendor selection. For example, by considering the firm's global foreign exchange exposure, preference can be given to vendors whose functional currencies reduce economic, transactional, or translational exposure. Vendor selection can also be used to exploit changes in foreign exchange rates to dynamically change vendors in order to (1) reduce production costs, (2) reduce taxes. For example, these goals can be accomplished by. (1) dynamically shifting the production to vendors with the lowest costs, given current or expected exchange rates; (2) assessing the impact of foreign exchange on vendor costs, and dynamically changing the choice of which supplier services which manufacturing facility, in order to decrease the profit margins of products manufactured in high tax jurisdictions, and increase the profit margins of products manufactured in low tax jurisdictions.

There may also be opportunities to exploit flexibility options in contracts with vendors to exploit changes in foreign exchange rates. This could be done, for example, by establishing multiple sources for products, and denominating the supplier contracts in different currencies. Purchasing costs could then be reduced by dynamically increasing allocations to suppliers whose exchange rate has depreciated, and dynamically decreasing allocations to suppliers whose exchange rate has appreciated.

A number of techniques can be used to perform this integration. These include:

- Using a set of heuristics, such as "allocate production to suppliers in regions whose currencies have a low or negative correlation with my current foreign exchange position;
- Using expert systems and/or other decision support tools to include foreign exchange risk management factors when making vendor selection decisions;
- Use of simulation techniques to identify vendor selection solutions that minimize the expected impact of foreign exchange risk, while maximizing expected return from investment in a new facility; and
- Use of linear programming, mixed integer programming, and other forms of optimization to maximize profit subject to certain foreign exchange risk parameters, or by using a multiple objective function that includes foreign exchange risk as an optimization objective, along with other objectives such as maximizing profit and meeting strategic requirements such as maintaining good relations with critical vendors.

Vendor Selection (Tactical) Considering Tax Management

This approach extends traditional supply chain vendor selection decisions, which determine which suppliers should be selected and used to manufacture a particular product. A number of tactical tax management considerations can be used to improve vendor selection. For example, in cases where there are multiple sources for a set of products, dynamic changes to production sourcing can reduce income taxes. This can be done by dynamically changing the choice of which supplier services which manufacturing facility, in order to decrease the profit margins of products manufactured in high tax jurisdictions, and increase profit margin products to low tax jurisdictions.

A number of techniques can be used to perform this integration. These include:

- Using a set of heuristics, such as "if two suppliers produce the same product or perform the same service, use the more expensive supplier in high tax jurisdictions, and the less expensive supplier in low tax jurisdictions if the benefits outweigh the additional management, logistics and supply chain costs";
- Using expert systems and/or other decision support tools to guide vendor selection decisions while considering tax management;
- Use of simulation techniques to identify high return, low risk solutions; and
- Use of linear programming, mixed integer programming, and other forms of optimization to maximize after-tax profit (perhaps with additional objectives such as reducing risk, and perhaps meeting particular strategic requirements such as maintaining good relations with critical vendors).

Sourcing of Production (Strategic/tactical) Considering Foreign Exchange Risk This approach extends traditional supply chain sourcing decisions, which determine which production facilities or suppliers should be used to manufacture a particular product. A number of foreign exchange risk management considerations can be used to improve planning and operations. For example, by considering the firm's global foreign exchange exposure, preference can be given to locations that reduce economic, transactional, or translational exposure. Sourcing of production can also be used to exploit changes in foreign exchange rates to dynamically change sourcing in order to (1) reduce production costs, (2) increase revenues, or (3) reduce taxes. For example, these two goals can be accomplished by: (1) dynamically shifting the production to locations with the lowest factor input costs; (2) dynamically shifting production to facilities collocated with markets having the highest prices for the manufactured products; and (3) assessing the impact of foreign exchange on local profit margins, then dynamically shifting production of low margin products to high tax jurisdictions, and shifting production of high margin products to low tax jurisdictions.

A number of techniques can be used to perform this integration. These include:

- Using a set of heuristics, such as "allocate production to facilities in regions whose currencies have a low or negative correlation with my current foreign exchange position;
- Using expert systems and/or other decision support tools to include foreign exchange risk management factors when making sourcing decisions;
- Use of simulation techniques to identify sourcing solutions that minimize the expected impact of foreign exchange risk, while maximizing expected return from investment in a new facility; and
- Use of linear programming, mixed integer programming, and other forms of optimization to maximize profit subject to certain foreign exchange risk parameters, or by using a multiple objective function that includes foreign exchange risk as an optimization objective, along with other objectives such as maximizing profit and meeting strategic requirements such as increasing regional market share.

Reducing Funding Costs and Cost of Capital (Both Short and Long Term) Using Vendor Selection, Sourcing of Production, and Location Decisions This approach extends traditional financial management techniques for reducing funding costs, by using supply chain management techniques such as vendor selection, sourcing, and site location. A number of supply chain decisions can influence both the short term and long term cost of capital. For example, strategically outsourcing certain functions and production processes to vendors can significantly alter a firm's degree of operating or financial leverage, thus reducing risk, and the firm's long-term cost of capital. Using vendors can also reduce working capital requirements, particularly for carrying inventory, and can thus reduce short term funding costs. The availability of low cost, subsidized funding, typically as an incentive to encourage investment, can reduce funding costs if activities are sourced or located in certain locations. To the extent that location decisions affect the firm's exposure to operating, political, geographic, and catastrophic risk, they also affect its cost of capital. By integrating these considerations when making vendor selection, sourcing, and location decisions, overall firm value can be increased.

A number of techniques can be used to perform this integration, These include:

- Using a set of heuristics, such as "all else being equal, locate production facilities in regions that provide geographical diversification";
- Using expert systems and/or other decision support tools to include the impact of vendor selection, sourcing, and site location on the firm's cost of capital; and
- Use of linear programming, mixed integer programming, and other forms of optimization to maximize shareholder value by including models linking the impact of vendor selection, sourcing, and location decisions on the firm's cost of capital.

Location of New Facilities Selected Considering Dividend Repatriation

This approach extends traditional supply chain location decisions, which determine where new facilities should be located. A number of dividend repatriation considerations can be used to improve location decisions. For example, implicit and explicit costs associated with dividend repatriation can be included in location decisions. This can be done by considering national dividend repatriation policies for alternative sites, and in particular any constraints on dividend repatriation. These can then be coordinated with the firm's projected cash requirements. In addition, the firm's business design—and withholding tax treaty network—can be analyzed to determine the financial impact of dividend and interest withholding taxes on location decisions. Thus, for example, if a firm anticipates a continuous need to repatriate dividends to meet projected cash obligations, it might favor sites in jurisdiction with more liberal dividend repatriation regulations. Alternatively, for a firm anticipating redeployment of capital for future investments in the location being considered, dividend repatriation restrictions should be given less weight.

A number of techniques can be used to perform this integration. These include:

- Using a set of heuristics, such as "if we see a frequent need to repatriate dividends, locate new facilities in regions with low dividend repatriation costs, and without onerous dividend repatriation restrictions";
- Using expert systems and/or other decision support tools to include the impact of dividend repatriation costs and restrictions when making location decisions; and
- Use of linear programming, mixed integer programming, and other forms of optimization to maximize profit subject to certain dividend repatriation constraints, within the context of an existing or projected withholding tax treaty network, and with deterministic or stochastic dividend repatriation costs.

Inventory Management Considering Personal Property Taxes (Total Cost of Inventory)

This approach extends traditional inventory management decisions, which determine the inventory required to meet customer service requirements, inventory reordering policies, etc. Many jurisdictions impose personal property taxes on a firm's assets, including inventory. In these cases, inventory management programs should seek to reduce the impact of personal property taxes. For example, this could be done by positioning higher value inventory in jurisdictions with low (or no) personal property taxes, after considering logistics costs, income taxes, etc.

A number of techniques can be used to perform this integration. These include:

- Using a set of heuristics, such as "all else being equal, hold high value inventory in jurisdictions with low personal property taxes, and low value inventory in jurisdictions with high personal property taxes";
- Using expert systems and/or other decision support tools to include the impact of personal property taxes when making inventory management decisions; and
- Use of linear programming, mixed integer programming, and other forms of optimization using personal property taxes in the cost function.

Sourcing of production (strategic/tactical) to assure profits are in countries where dividend repatriation is favorable This approach extends traditional supply chain sourcing decisions, which determine which production facilities or suppliers should be used to manufacture a particular product. A number of dividend repatriation considerations can be used to improve sourcing decisions. For example, implicit and explicit costs associated with dividend repatriation can be included in sourcing decisions. This can be done by considering national dividend repatriation policies for alternative sources, and in particular any constraints on dividend repatriation. These can then be coordinated with the firm's projected cash requirements. In addition, the firm's business design and withholding tax treaty network can be analyzed to determine the financial impact of dividend and interest withholding taxes on sourcing decisions. Thus, for example, if a firm anticipates an immediate need to repatriate dividends to meet projected cash obligations, it might transfer more profitable production to sites in jurisdiction with more liberal dividend repatriation regulations. Alternatively, for a firm anticipating redeployment of capital for future investments for a particular production facility, dividend repatriation restrictions should be given less weight.

A number of techniques can be used to perform this integration. These include:

- Using a set of heuristics, such as "if we see an immediate need to repatriate dividends, transfer production of high margin products to facilities in regions with low dividend repatriation costs, and without onerous dividend repatriation restrictions";
- Using expert systems and/or other decision support tools to include the impact of dividend repatriation costs and restrictions when making sourcing decisions; and
- Use of linear programming, mixed integer programming, and other forms of optimization to maximize profit subject to certain dividend repatriation constraints, within the context of an existing or projected withholding tax treaty network, and with deterministic or stochastic dividend repatriation costs.

Vendor Selection (Strategic/tactical) Considering Constraints on Dividend Repatriation This approach extends traditional supply chain vendor selection decisions, which determine which suppliers should be selected and used to manufacture a particular product.

Dividend repatriation considerations can be used to improve vendor selection decisions. Implicit and explicit costs associated with dividend repatriation can be included in vendor selection decisions, particularly when deciding what production and services to outsource. For example, in certain cases, strategic constraints such as the availability of skilled labor, and the availability of suitable production technology, imply that certain types of production must be performed in certain countries. In these cases, constraints on dividend repatriation, and costs associated with dividend repatriation, should be considered when deciding whether or not production should be outsourced. In addition, the firm's business design and withholding tax treaty network can be analyzed to determine the financial impact of dividend and interest withholding taxes on outsourcing decisions, Thus, if a firm has capital budget constraints, and is contemplating outsourcing one of two production capabilities that can only be performed in particular countries, then all else being equal, it should outsource the capability to the firm with the greater dividend repatriation constraints and/or costs.

A number of techniques can be used to perform this integration. These include:

Using a set of heuristics, such as "all other factors being equal, outsource the production capability that must be performed in the country with the most onerous dividend repatriation restrictions";

Using expert systems and/or other decision support tools to include the impact of dividend repatriation costs and restrictions when making vendor selection decisions; and Use of linear programming, mixed integer programming, and other forms of optimization to maximize profit subject to certain dividend repatriation constraints, within the context of an existing or projected withholding tax treaty network, and with deterministic or stochastic dividend repatriation costs.

Blocked Funds in a Country Addressed by Vendor Selection, Sourcing of Production (Strategic/tactical), or Location Decisions This approach extends traditional financial management techniques for managing the repatriation of blocked funds with supply chain management techniques such as vendor selection, sourcing, and site location. For example, if funds are blocked in a particular country, vendor selection can be used to identify local vendors who can be paid with blocked funds to export goods that can be used by the firm in later stages of production, effectively freeing tip funds. Similarly, sourcing decisions can be made to minimize the profitability of goods and services performed in the country, thus reducing the magnitude of the blocked funds. Location decisions can also be used, since siting now facilities that are anticipated to generate losses during the period of funds blockage can also effectively free up funds.

A number of techniques can be used to perform this integration. These include:

Using a set of heuristics, such as "If funds are blocked in a particular country, use it for the production of low margin products";

Using expert systems and/or other decision support tools to include the impact of vendor selection, sourcing, and site location on access to blocked funds; and Use of linear programming, mixed integer programming, and other forms of optimization to maximize profit subject to the constraint imposed by blocked funds.

Customer Selection (Product Allocation) Considering Credit Risk (For All Operating Divisions, Etc.)

This approach extends traditional customer selection decisions, which determine which customers and markets should be serviced. A number of credit risk considerations can be addressed through customer selection. For example, multiple credit exposures to the same customer by different operating divisions can be netted to assess global counterparty risk. Customers in some cases may also be suppliers, and there may also be financial obligations from or to a given customer. These can all be netted to assess credit risk, and influence allocation and credit terms to be extended to the customer.

A number of techniques can be used to perform this integration. These include:

Using a set of heuristics, such as "limit allocations to customers that have exceeded their global credit limit, after netting out our obligations for goods and services we have purchased from them, and for which payment is outstanding";

Using expert systems and/or other decision support tools to include credit risk management factors when making customer selection decisions;

Use of simulation techniques to identify customer selection solutions that minimize the expected impact of credit risk, while maximizing expected returns; and Use of linear programming, mixed integer programming, and other forms of optimization to maximize profit subject to certain credit risk limits or constraints, or by using a multiple objective function that includes foreign exchange risk as an optimization objective, along with other objectives such as maximizing profit and meeting strategic requirements such as maintaining good relations with key customers.

Customer Selection Taking into Account Foreign Exchange Risk

This approach extends traditional customer selection decisions, which determine which customers and markets should be serviced. A number of foreign exchange risk management considerations can be used to improve customer selection. For example, by tactically and strategically considering the firm's global foreign exchange exposure, preference can be given to customers and markets whose functional currencies reduce economic, transactional, or translational exposure. Particularly in cases where customer demand exceeds production capacity, tactical customer selection can also be used to exploit changes in foreign exchange rates to dynamically choose customers in order to (1) increase revenues, or (2) reduce taxes. For example, these goals can be accomplished by: (1) dynamically shifting sales to customers in markets having the highest prices for the manufactured products; and (2) assessing the impact of foreign exchange on local profit margins, then dynamically shifting sales of low margin products to high tax jurisdictions, and shifting sales of high margin products to low tax jurisdictions.

A number of techniques can be used to perform this integration. These include:

Using a set of heuristics, such as "allocate output to customers in regions whose currencies have a low or negative correlation with my current foreign exchange position";

Using expert systems and/or other decision support tools to include foreign exchange risk management factors when making customer selection decisions;

Use of simulation techniques to identify customer selection solutions that minimize the expected impact of foreign exchange risk, while maximizing expected returns; and Use of linear programming, mixed integer programming, and other forms of optimization to maximize profit subject to certain foreign exchange risk parameters, or by using a multiple objective function that includes foreign exchange risk as an optimization objective, along with other objectives such as maximizing profit and meeting strategic requirements such as maintaining good relations with key customers.

Customer Order Scheduling Taking into Account Foreign Exchange Risk

This approach extends traditional order scheduling decisions, which determine the sequence in which customer orders should be serviced. A number of foreign exchange risk management considerations can be used to improve order scheduling. For example, by considering the timing of the firm's global foreign exchange transactions, preference can be given to customers whose functional currencies reduce short-term transactional (or, near quarterly financial reporting dates, translational exposure). Customer selection can also be used to exploit changes in foreign exchange rates to dynamically schedule customer orders to increase revenues. For example, this can be accomplished by: (1) dynamically expediting sales to customers in markets having the highest prices for the manufactured products, or to customers in markets where exchange rate depreciation is anticipated; and (2) dynamically delaying sales to customers in markets having the lowest prices for the manufactured products, or to customers in markets where exchange rate appreciation is anticipated.

A number of techniques can be used to perform this integration. These include:

Using a set of heuristics, such as "delay the commit date for customers paying in a certain currency to match the timing of an anticipated supplier payment denominated in the same currency";

Using expert systems and/or other decision support tools to include foreign exchange risk management factors when making customer order scheduling decisions ; and Use of linear programming, mixed integer programming, and other forms of optimization to maximize profit subject to certain foreign exchange risk parameters, or by using a multiple objective function that includes foreign exchange risk as an optimization objective, along with other objectives such as maximizing profit and meeting strategic requirements such as maintaining good relations with key customers.

Customer Order Scheduling Taking into Account Timing of the Cash to Cash Cycle, and the Firm's Cash Needs This approach extends traditional order scheduling decisions, which determine the sequence in which customer orders should be serviced. A number of cash management considerations can be used to improve order scheduling. For example, by considering the timing of the firm's cash to cash cycle, the firm's cash needs, and its short-term borrowing and lending rates, preference can be given to customers who historically have shown certain payment patterns. For example, if a firm is constrained on cash, it might decide to give preference to customers that historically have paid the earliest, even if that means accepting lower revenue since trade discounts will have to be accepted. If the firm has excess cash, and a low lending rate, it may decide to give preference to customers with a good credit history, but requiring extended payment terms. More sophisticated examples would coordinate expected timing of customer payments with global, multi-currency asset-liability management.

A number of techniques can be used to perform this integration. These include:

Using a set of heuristics, such as "if cash is tight, ship to customers who historically have paid early"; 2Using expert systems and/or other decision support tools to include local or global cash management factors when making customer order scheduling decisions; and Use of linear programming, mixed integer programming, and other forms of optimization using a multiple objective function that includes cash management factors such as the firm's anticipated cash inflows and outflows by currency, its short-term borrowing and lending rates, its cash on hand, and the credit limits on the revolver agreements with its banks. Other objectives would probably include maximizing profit, and meeting strategic requirements such as maintaining good relations with key customers.

Inventory Management Considering the Timing of Cash Flows

This approach extends traditional inventory management decisions, which determine the inventory required to meet customer service requirements, inventory reordering policies, etc. A number of cash management considerations can be used to improve inventory management. For example, by considering the timing of the firm's cash to cash cycle, the firm's cash needs, and its short-term borrowing and lending rates, (1) overall inventory levels can be tailored to reflect the availability and cost of cash; (2) the timing of inventory purchases can be coordinated to reflect the availability and cost of cash; and (3) inventory levels for individual products or groups of products can be tailored to reflect the historical payment patterns for those products or groups of products. For example, if a firm is constrained on cash, it might decide to temporarily sacrifice customer serviceability by globally reducing inventory levels. Similarly, a firm may decide to take a more targeted approach, and only reduce inventory levels for product lines that have historically been slow to pay. A firm might also decide to defer purchases of inventory for a non-strategic product that has recently shown low demand. More sophisticated techniques could combine two or more of these approaches.

A number of techniques can be used to perform this integration. These include:

Using a set of heuristics, such as "if cash is tight, defer purchases of low margin inventory for segments with high demand variability";

Using expert systems and/or other decision support tools to include local or global cash management factors when making inventory management decisions; and Use of linear programming, mixed integer programming, and other forms of optimization using a multiple objective function that includes cash management factors such as the firm's anticipated cash inflows and outflows by currency, its short-term borrowing and lending rates, its cash on hand, and the credit limits on the revolver agreements with its banks. Other objectives would probably include maximizing profit, and meeting strategic requirements such as maintaining good relations with key customers.

Referring again to FIG. 2, once the FM information has been integrated with the selected activities or solutions, a determination of whether the process is affected by FM objectives is made in decision block 206. FM activities and solutions frequently have different objectives from SCM activities and solutions. For example, SCM activities and solutions often have objectives such as improving cycle time, increasing customer service, reducing logistics costs, reducing inventory, improving demand forecasts, and improving asset utilization. FM activities and solutions, on the other hand, may have objectives such as reducing risk, reducing funding costs, maximizing the value of the firm, increasing liquidity, and improving financial asset utilization. At this step, it is determined whether the activity or solution is affected by FM objectives. Being affected by FM objectives means that improvements in strategy, tactics, planning or operations would result by broadening the scope of objectives considered in the activity or solution through integration.

If so, one or more FM objectives are integrated to improve the performance of the SCM activity or solution in block 208. This can be performed in a number of different ways, depending on the nature of the activity or solution, and the objective being integrated. Typical approaches could use techniques such as heuristics, consulting methodologies, simulation, and optimization. Examples of objectives that could be integrated include reducing funding costs, increasing liquidity, reducing foreign exchange risk, or reducing cost of capital.

A determination is then made as to whether the process is affected by risk management objectives in decision block 210. In this step, risk management objectives are construed rather broadly to include any form of risk that affects the firm. Thus, it could include insurable risks, as well as market risk, business risk, interest rate risk, uninsurable catastrophe risk, weather risk, political risk, liquidity risk credit risk, counterparty risk, etc. Many of these risk factors are already considered as part of the FM objectives discussed above. However, in some cases, there may be additional risk factors that should be included, either because they are not considered explicitly by the FM activitie(s) or solution(s) being integrated, or because they are outside the scope of traditional FM.

If the process is affected by risk management objectives, then one or more risk management objectives are integrated to improve the performance of the activity or solution in block 212. This can be performed in a number of different ways, depending on the nature of the activity or solution, and the objective being integrated. Typical approaches could use techniques such as heuristics, consulting methodologies, simulation, and optimization. Examples of objectives that could be integrated include mitigation or reduction of risk factors such as market risk, business risk, interest rate risk, uninsurable catastrophe risk, weather risk, political risk, liquidity risk, credit risk, and counterparty risk.

A determination is then made as to whether the process will benefit from using FM techniques, in decision block 214. FM activities and solutions frequently employ different analysis, management, and decision support techniques than SCM activities and solutions. For example, SCM activities and solutions often employ approaches from the disciplines of Industrial Engineering, Operations Research, and Management Science. FM activities and solutions, on the other hand, often employ solutions from the disciplines of Finance, Economics, Financial Economics, Accounting, Taxation, Law, and Actuarial Science. In this step, it is determined whether the activity or solution will benefit from using FM techniques.

If so, then FM techniques are employed in block 216. In this step, one or more FM technique(s) are employed to improve the performance of the activity or solution. Different approaches might be used, depending on the nature of the activity or solution, and the technique being employed. Typical approaches could use techniques such as value at risk techniques, option valuation analytics, and portfolio management techniques.

Extensions to Financial Management Using Supply Chain Management Techniques

The section above presented a number of examples of potential opportunities to extend SCM using FM considerations. There are also opportunities to extend financial management using supply chain techniques.

Perhaps the most promising is the application of operations research techniques to supply chain network design, and corporate ownership network design. Traditionally, heuristic approaches have been used to design the ownership structure of a multi-entity multinational firm, with only limited coordination with the firm's supply chain design. By simultaneously optimizing both these networks, profits can be globally optimized, given a set of national corporate tax and withholding tax regimes, a transfer pricing methodology, customer demands, and global supply chain requirements.

There are also a number of opportunities to apply operations research techniques to improve treasury operations. Optimization techniques can be used to improve the scheduling of the timing of cash flows, such as dividend repatriations. Although optimization techniques have been used for cash management and asset liability management, optimizations that link cash management systems with SCM systems will benefit from improved cash forecasts.

Figure 3:
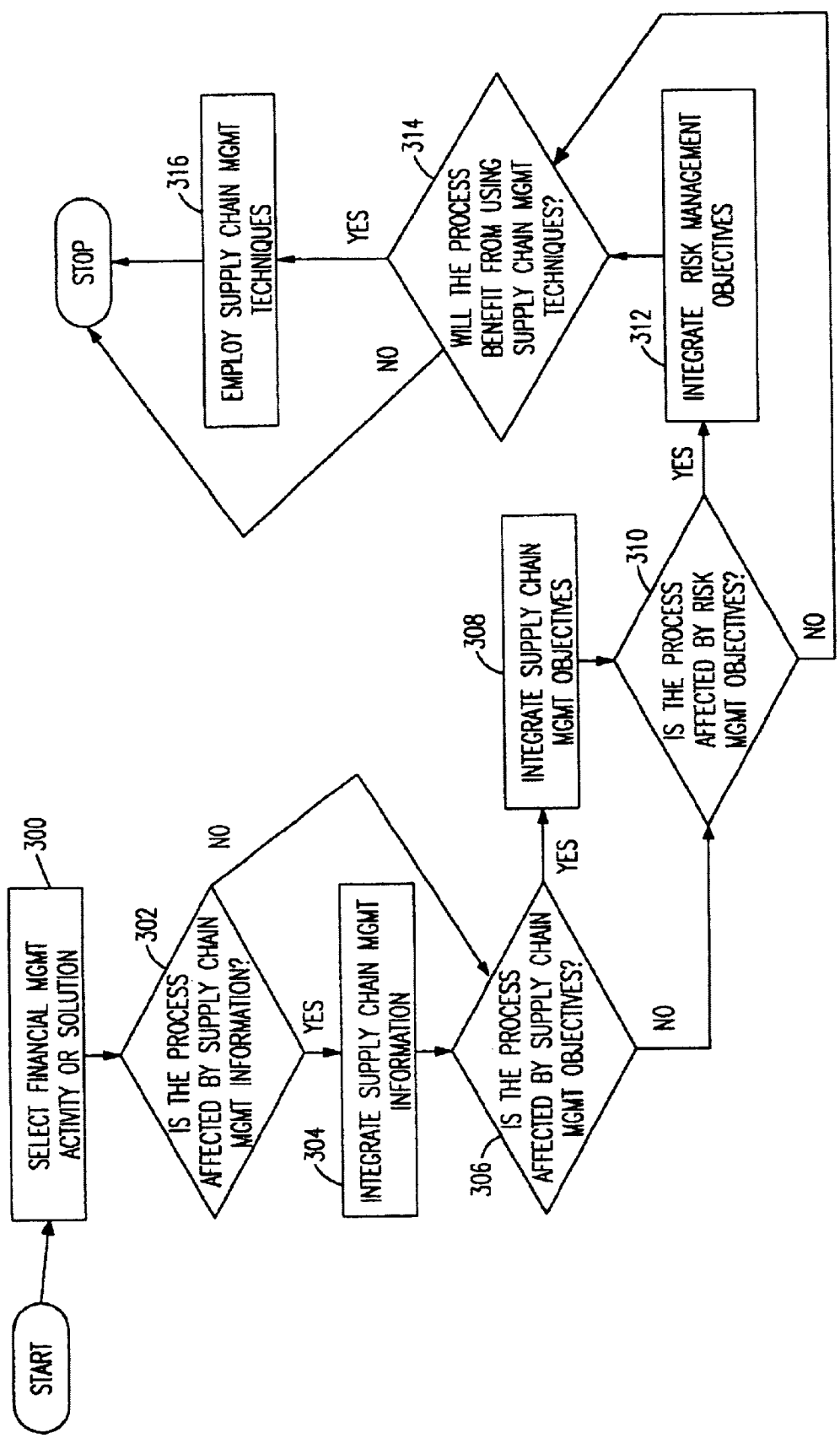
FIG. 3 is a flow diagram of the general method for extending Financial Management solutions according to the present invention.

Referring now to FIG. 3, there is shown a flow diagram of the general method for extending FM solutions according to the present invention. If management chooses to plan by extending the FM activity or solution with SCM information, the process begins at block 300. One or more FM activities or solutions is selected for integration.

A determination is then made as to whether the selected process(es) are affected by SCM information, in decision block 302. Being affected by SCM information means that improvements in strategy, tactics, planning, or operations would result by broadening the scope of information available through integration. SCM information is information used by, useful for, required by, or available to, SCM activities or solutions.

If the selected process(es) are affected by SCM information, then SCM information is integrated to improve the performance of the FM activity or solution in block 304. This can be performed in a number of different ways, depending on the nature of the activity or solution, and the information being integrated. Typical approaches could use techniques such as heuristics, consulting methodologies, simulation, and optimization.

Examples of embodiments of this form of integration include:

Strategic business design considering taxes, transfer pricing, manufacturing and network design;

Reducing Funding Costs and Cost of Capital (both short and long term) using Vendor selection, sourcing of production, and location decisions Strategic manufacturing and network design considering ownership structure; and Blocked funds in a country addressed by vendor selection, sourcing of production (strategic/tactical), or location decisions.

A determination is then made as to whether the activity or solution is affected by SCM objectives, in decision block 306. SCM activities and solutions frequently have different objectives from FM activities and solutions. For example, SCM activities and solutions often have objectives such as improving cycle time, increasing customer service, reducing logistics costs, reducing inventory, improving demand forecasts, and improving asset utilization. FM activities and solutions, on the other hand, may have objectives such as reducing risk, reducing funding costs, maximizing the value of the firm, increasing liquidity, and improving financial asset utilization. Being affected by SCM objectives means that improvements in strategy, tactics, planning, or operations would result by broadening the scope of objectives considered in the activity or solution through integration.

If the activity or solution is affected by SCM objectives, then one or more SCM objectives are integrated to improve the performance of the FM activity or solution, in block 308. This can be performed in a number of different ways, depending on the nature of the activity or solution, and the objective being integrate. Typical approaches could use techniques such as heuristics, consulting methodologies, simulation, and optimization. Examples of objectives that could be integrated include improving cycle time, increasing customer service, reducing logistics costs, reducing inventory, improving demand forecasts, and improving asset utilization.

A determination is then made as to whether the process is affected by risk management objectives, as described above, in decision block 310. Many of these risk factors are already considered as part of the FM objectives discussed above. However, in some cases, there may be additional risk factors that should be included, either because they are not considered explicitly by the FM activitie(s) or solution(s) being integrated, or because they are outside the scope of traditional FM.

If the process is affected by risk management objectives, then one or more risk management objectives are integrated to improve the performance of the activity or solution, in block 312. This can be performed in a number of different ways, depending on the nature of the activity or solution, and the objective being integrated. Typical approaches could use techniques such as heuristics, consulting methodologies, simulation, and optimization. Examples of objectives that could be integrated include mitigation or reduction of risk factors such as market risk, business risk, interest rate risk, uninsurable catastrophe risk, weather risk, political risk, liquidity risk, credit risk, and counterparty risk.

A determination is then made as to whether the process will benefit from using SCM techniques, in decision block 314. FM activities and solutions frequently employ different analysis, management, and decision support techniques than SCM activities and solutions. For example, SCM activities and solutions often employ approaches from the disciplines of Industrial Engineering, Operations Research, and Management Science. FM activities and solutions, on the other hand, often employ solutions from the disciplines of Finance, Economics, Financial Economics, Accounting, Taxation, Law, and Actuarial Science.

If the activity or solution will benefit from using SCM techniques, then one or more SCM technique(s) are employed to improve the performance of the activity or solution in block 316. Different approaches might be used, depending on the nature of the activity or solution, and the technique being employed. Typical approaches could use techniques such as linear programming, mixed integer programming, and other optimization and scheduling techniques.

Figure 4:
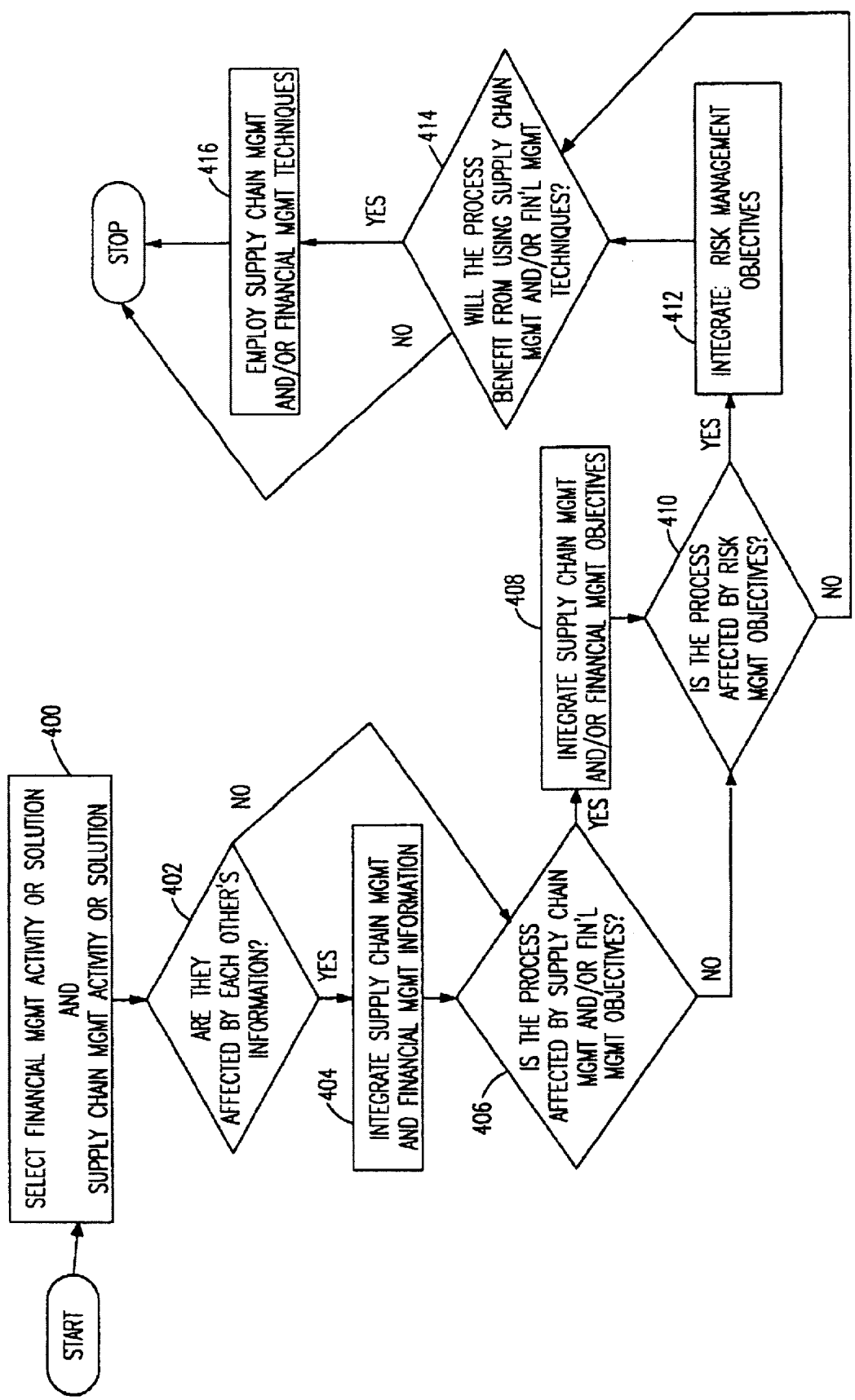
FIG. 4 is a flow diagram of the general method for extending both Supply Chain Management and Financial Management solutions according to the present invention.

Extensions to Both Supply Chain Management and Financial Management Using the Other's Techniques Management may choose to plan by extending both SCM and FM and with the techniques used by the other management methodology. Referring now to FIG. 4, there is shown a flow diagram of the general method for extending both SCM and FM solutions according to the present invention. The process begins at block 400. In this step, one or more SCM activities or solutions and one or more FM activities or solutions are selected for integration. Examples of SCM activity or solutions are described above. Examples of FM activity or solutions are also described above. A determination is then made as to whether the selected SCM and FM activities or solutions are affected by each other's information, i.e. by either FM information, SCM information, or both, in decision block 402. Being affected by each other's information means that improvements in strategy, tactics, planning, or operations would result by broadening the scope of information available through integration. FM information is information used by, useful for, required by, or available to, FM activities or solutions. Examples of FM activity or solutions are described above. Supply Chain information is information used by, useful for, required by, or available to, SCM activities or solutions. Examples of and SCM activity and solutions are described above.

If SCM and FM information affect each other's information, then SCM and FM information is integrated to improve the performance of the activity or solution, in block 404. This can be performed in a number of different ways, depending on the nature of the activity or solution, and the information being integrated. Typical approaches could use techniques such as heuristics, consulting methodologies, simulation, and optimization.

Examples of embodiments of this form of integration include:

Strategic business design considering taxes, transfer pricing, manufacturing and network design;

Strategic manufacturing and network design considering ownership structure;

Simultaneous business design and network design;

Sourcing of production (tactical) considering tax management;

Location of new facilities selected considering foreign exchange risk;

Vendor selection (strategic/tactical) considering foreign exchange risk;

Vendor selection (tactical) considering tax management;

Sourcing of production (strategic/tactical) considering foreign exchange risk;

Reducing Funding Costs and Cost of Capital (both short and long term) using Vendor selection, sourcing of production, and location decisions;

Location of new facilities selected considering dividend repatriation;

Inventory management considering personal property taxes (total cost of inventory);

Sourcing of production (strategic/tactical) to assure profits are in countries where dividend repatriation is favorable;

Vendor selection (strategic/tactical) considering constraints on dividend repatriation;

Blocked funds in a country addressed by vendor selection, sourcing of production (strategic/tactical), or location decisions;

Customer selection (product allocation) considering credit risk (for all operating divisions, etc.);

Customer selection taking into account foreign exchange risk;

Customer order scheduling taking into account foreign exchange risk;

Customer order scheduling taking into account timing of the cash to cash cycle, and the firm's cash needs; and Inventory management considering the timing of cash flows.

A determination is then made as to whether the process is affected by SCM and/or FM objectives, in decision block 406. FM activities and solutions frequently have different objectives from SCM activities and solutions. For example, SCM activities and solutions often have objectives such as improving cycle time, increasing customer service, reducing logistics costs, reducing inventory, improving demand forecasts, and improving asset utilization. FM activities and solutions, on the other hand, may have objectives such as reducing risk, reducing funding costs, maximizing the value of the firm, increasing liquidity, and improving financial asset utilization. Being affected by SCM and/or FM objectives means that improvements in strategy, tactics, planning, or operations would result by broadening the scope of objectives considered in the activity or solution through integration.

If the process is affected by SCM and/or FM objectives, then one or more SCM and/or FM objectives are integrated to improve the performance of the activity or solution in block 408. This can be performed in a number of different ways, depending on the nature of the activity or solution, and the objective being integrated. Typical approaches could use techniques such as heuristics, consulting methodologies, simulation, and optimization. Examples of objectives that could be integrated include improving cycle time, increasing customer service, reducing logistics costs, reducing inventory, improving demand forecasts, improving asset utilization, reducing funding costs, increasing liquidity, reducing foreign exchange risk or reducing cost of capital.

A determination is then made as to whether the process is affected by risk management objectives, in decision block 410. In this step, risk management objectives are construed rather broadly to include any form of risk that affects the firm, as described above. Many of these risk factors are already considered as part of the SCM or FM objectives discussed above. However, in some cases, there may be additional risk factors that should be included, either because they are not considered explicitly by the SCM and/or FM activitie(s) or solution(s) being integrated, or because they are outside the scope of traditional SCM and/or FM activities or solutions.

If the process is affected by risk management objectives, then one or more risk management objectives are integrated to improve the performance of the activity or solution, in block 412. This can be performed in a number of different ways, depending an the nature of the activity or solution, and the objective being integrated. Typical approaches could use techniques such as heuristics, consulting methodologies, simulation, and optimization. Examples of objectives that could be integrated include mitigation or reduction of risk factors such as market risk, business risk, interest rate risk, uninsurable catastrophe risk, weather risk, political risk, liquidity risk, credit risk, and counterparty risk.

A determination is then made as to whether SCM and/or FM techniques should be employed to benefit the process, in decision block 414. FM activities and solutions frequently employ different analysis, management, and decision support techniques than SCM activities and solutions. For example, SCM activities and solutions often employ approaches from the disciplines of Industrial Engineering, Operations Research, and Management Science. FM activities and solutions, on the other hand, often employ solutions from the disciplines of Finance, Economics, Financial Economics, Accounting, Taxation, Law, and Actuarial Science. In this step, it is determined whether the activity or solution will benefit from using SCM and/or FM techniques.

If SCM and/or FM techniques are to be employed, then one or more SCM and/or FM techniques are employed to improve the performance of the activity or solution, in block 416. Different approaches might be used, depending on the nature of the activity or solution, and the technique being employed. Typical approaches could use techniques such as linear programming, mixed integer programming, and other optimization and scheduling techniques, value at risk techniques, option valuation analytics, and portfolio management techniques.

While the invention has been described in terms of its preferred embodiment which includes a variety of combinations, those skilled in the art will recognize that the invention can be practiced with modification within the spirit and scope of the appended claims.

Having thus described our invention, what we claim as new and desire to secure by letters patent is as follows:

1. A method to assist decision-making, and to closely monitor various performance measures of an enterprise by extending supply chain management using financial management considerations, said method being performed on a computer and comprising the steps of:

selecting at least one activity or solution related to supply chain management for consideration using a computer resource;

determining whether the selected at least one activity or solution is affected by financial management information, and if so, then integrating the affecting financial information with information related to the selected at least one activity or solution using a computer resource;

developing a process to generate a strategic or operational business plan that provides a solution for the selected at least one activity or solution related to supply chain management using a computer resource;

determining whether the process is affected by financial management objectives, and if so, then integrating the affecting financial management objectives with objectives related to the process using a computer resource;

determining whether the process will benefit from utilizing financial management techniques, and if so, then employing financial management techniques benefitting the process using a computer resource;

selecting the financial management techniques from the group of value at risk techniques, option valuation analytics, and portfolio management techniques using computer resources; and performing the process using information, objectives, risk management objectives, and techniques associated with the at least one selected activity or solution including information, objectives, risk management objectives integrated in the determining steps, and using financial management techniques identified as beneficial to the process using a computer resource.

2. A method as recited in claim 1, wherein the at least one selected activity or solution is selected from the group of demand planning comprising: forecasting and targeted marketing;

production planning comprising: category management, materials planning, procurement and capacity planning;

transportation planning comprising: carrier management, load planning, and import/export regulations compliance;

inventory management, transportation scheduling comprising: route planning, vehicle scheduling, and in-transit goods management;

distribution, finished goods inventory planning, distributed resources planning, and deployment planning.

3. A method as recited in claim 1, wherein financial management objectives are selected from the group of reducing risk, reducing funding costs, maximizing the value of the firm, increasing liquidity, reducing foreign exchange risk, or reducing cost of capital and improving financial assets utilization.

4. A method recited in claim 1, wherein risk management objectives are related to risks that affect the enterprise including insurable risks, market risks, business risks, interest rates risks, uninsurable catastrophe risks, weather risks, political risks, liquidity risks, credit risks and counterparty risks.

* * * * *